United States Patent Office

3,488,143
Patented Jan. 6, 1970

3,488,143
METAL HALIDES PRODUCTION IN FLUID BED
Charles B. Wendell, Canton, Mass., and Michael J. Greene, Merrimack, N.H., assignors to Cabot Corporation, Boston, Mass., a corporation of Delaware
Filed June 8, 1966, Ser. No. 556,065
Int. Cl. C01b 9/02, 9/00; B01j 1/00
U.S. Cl. 23—87                                6 Claims

ABSTRACT OF THE DISCLOSURE

Chlorination of metal bearing solids while suspended in a fluid bed by fluidizing gases to produce vaporous metal chlorides is improved by introducing the chlorinating gas into the lower part of an upwardly diverging, vertical, frustoconical reaction zone with a high speed lateral spinning action and at a rate sufficient to fluidize said solids in the form of a well defined, rapidly whirling, turbulent bed.

---

This invention relates to the production of metal chlorides and more specifically to an improved process for the production of metal chlorides.

A well known commercial process for producing gaseous metal chlorides concerns the chlorination of reactants in a fluid bed reactor. In general, in such a process, reactants are suspended partially or wholly within a bed while chlorinating gases are passed therethrough. Processes utilizing fluid bed reactors are generally suitable for use in the production of titanium tetrachloride, silicon tetrachloride, ferric chloride, and the like.

However, one serious problem often encountered during fluid bed operations resides in the fact that during continuous production of metal chlorides, gas distribution lines through which gases enter into the fluid bed reactor are frequently wholly or partially plugged by solid reactants and/or products. In addition, severe erosion at or near the gas distribution lines generally occurs. Consequently plugging and/or erosion of gas distribution lines usually results in significant changes in reaction parameters and can therefore have deleterious effects on product quality and uniformity. Thus, it is generally found that frequent shutdown of operations is required in order to repair or replace the gas distribution lines and/or unplug said lines to restore uniform entry and mixing of gases within the reactor. In accordance with the present invention, however, these problems have been virtually eliminated.

Accordingly, it is a principal object of the present invention to provide an improved process for the production of gaseous metal chlorides.

Other objects of the present invention will in part be obvious and will in part appear hereinafter.

In accordance with the present invention it has been found that plugging and/or erosion of gas distribution lines associated with fluid bed reactor operations is substantially eliminated by conducting gases tangentially into the frusto-conical portion of a reactor thereby causing circular or helical motion of the solids within said reactor and forming a pocket therein into which pocket solids charged are drawn.

Figure 2:
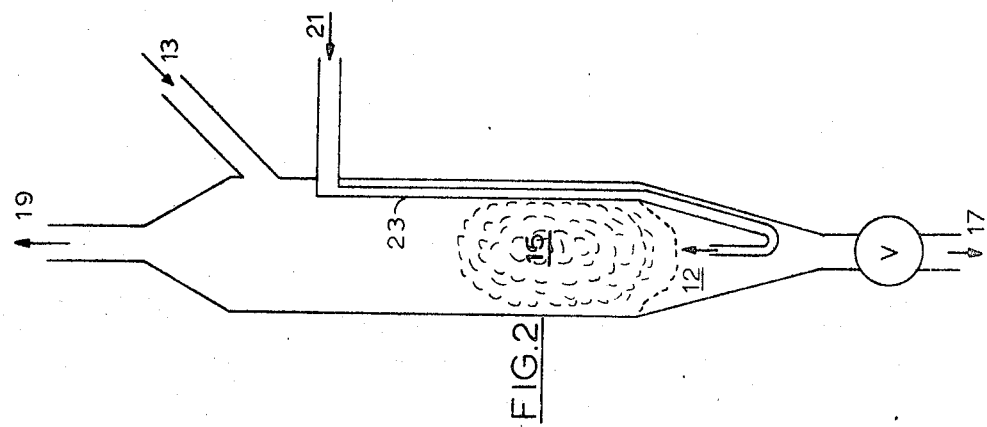
Figure 1:
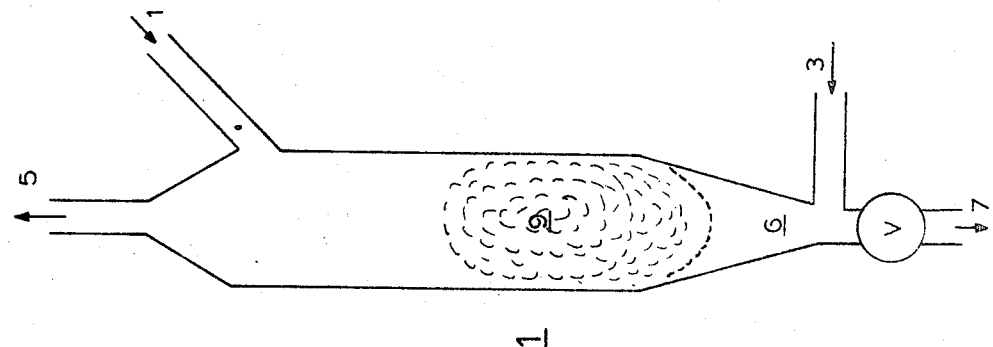

The above and other objects and advantages of the present invention will be more readily understood when reference is had to the accompanying drawings forming part hereof wherein:

FIGURE 1 is a schematic diagrammatic longitudinal view of apparatus of the general type that can be utilized in accordance with the present invention wherein reactant and fuel gases are conducted tangentially into a conically shaped section of a reactor thereby causing circular or helical turbulence within the reactor; and FIGURE 2 is a schematic diagrammatic view of a preferred apparatus suitable in practicing the present invention wherein reactant and fuel gases are introduced tangentially into an annulus positioned about the outer surfaces of the reactor and the resulting spinning stream is conducted into the conically shaped section of a reactor.

In a typical operation, referring now to FIGURE 1, an oxygen-containing gas is introduced into reaction zone 9 through throat 6 by means of tangential conduit 3. Said gas whirls or spins within reaction zone 9 due to the mode of introduction. Next, coke is introduced into reaction zone 9 by means of entry port 1 and is drawn into the pocket of the whirling or spinning gas. The mixture of free oxygen-containing gas and coke is ignited, thereafter reacting and preheating reaction zone 9. After sufficient preheating, sand and additional coke are introduced into reaction zone 9 by means of entry port 1 and are drawn into the pocket of the whirling gas and coke mixture and fluidized, thus intermingling uniformly. The flow of free oxygen-containing gas is gradually decreased and chlorine is introduced through throat 6 into reaction zone 9 by means by tangential conduit 3. Silicon tetrachloride vapor is produced, and exits through conduit 5 and is collected by any suitable means. After a few hours operation, the flow of gases is stopped and the residue remaining within reaction zone 9 is removed through outlet 7.

In a typical run in the preferred apparatus of the present invention, referring now to FIGURE 2, a spinning free oxygen-containing gas is introduced into reaction zone 15 through throat 12 by means of tangential conduit 21 and annulus 23. Coke is introduced into reaction zone 15 by means of entry port 13 and is drawn into the pocket of said spinning gas. The mixture in zone 15 is ignited, thereafter reacting, preheating said zone. After sufficient preheating, titaniferous ore and additional coke are introduced into zone 15 by means of entry port 13 and are drawn into the pocket of the spinning gas and fluidized, thus intermingling homogeneously. Next the quantity of free oxygen-containing gas introduced is gradually decreased and chlorine is introduced into reaction zone 15 by means of conduit 21 and annulus 23. Titanium tetrachloride vapor produced within zone 15 exits through conduit 19 and is collected by any suitable means. After a few hours operation, the flow of gases is discontinued and residue is removed from reaction zone 15 through outlet 17.

It should be noted that the advantages attained by the present invention are achieved by maintaining a well defined, high speed whirling mixture of the reactants in the reaction zone and well above the bottom extremities of the reaction chamber thereby allowing no opportunity for plugging and/or erosion of gas distribution lines and associated equipment. Contrastingly, in prior art apparatus, gases are generally conducted into the reaction zone of a fluid bed reactor by complex gas distribution systems located at the bottom of the reactor. Thus, gas lines are frequently plugged with solids resulting from reduced flow of gases therein and/or recirculation of solids within the reactor. Accordingly, in prior art processes and apparatus, frequent shutdown of the operation is required to unplug and repair gas distribution lines and equipment.

It should be further noted that when the preferred apparatus of this invention is employed, wherein gases introduced into the fluid bed reactor are introduced tangentially and flow helically through an annulus about the outer walls of the reactor, the helically flowing gases in the annulus act as coolants for the walls of the reactor and allow for the walls of the reactor to be fabricated of less heat resistant materials and for less heat loss from the reactor.

Obviously, the design and specifications of the apparatus of the present invention are subject to considerable variation. However, it should be noted that the angle of divergence of the conical section of the fluid bed reactor, the length/diameter ratio thereof and the like are, to some extent, dependent upon the particular reactants to be employed, particular products of reaction, desired output capability, velocity of gases, temperatures required and the like.

The materials from which the fluid bed reactor of the present invention can be fabricated can vary to a large extent. In general, any metal, metal alloy, ceramic composition or the like which is substantially inert to the reactants, products of reaction, temperatures, etc., is suitable. For instance, materials that are generally suitable for fabrication of the apparatus of the present invention are stainless steel, aluminum, nickel, glass, graphite, vitreous silica and the like.

In general, apparatus suitable for use in conjunction with the fluid bed reactor of the present invention is of conventional design and construction. For instance, burners, furnaces, heaters, heat exchangers, etc., utilized for the manufacture of metal chlorides are well known. Obviously, therefore, the design, size and other parameters of the apparatus associated with the process and apparatus of the present invention do not form part of the present invention.

The reactants utilized in accordance with the process of the present invention are subject to considerable variation. For instance, metals and metal compounds such as silica, rutile, silicon metal, titaniferous magnetite, silicon carbide, ilmenite and the like can be utilized to produce volatile metal halides. Said materials can be introduced into the fluid bed reactor in any suitable manner such as alone or in combination with other materials which are commonly utilized in fluid bed reactors.

The methods utilized in preheating and/or supplying heat to the fluid bed reactor of the present invention can vary depending to a large extent upon temperatures desired, reactants, products of reaction, etc. For instance, external heating means such as heaters, heat exchangers and the like can be employed in accordance with the present invention. Also the reaction of a fuel gas such as methane, propane, carbon monoxide, sulfur chloride and an oxygen-containing gas is entirely suitable. However, the reaction of a carbonaceous material such as coke, carbon, graphite and the like and an oxygen-containing gas such as oxygen, oxygen-enriched air and the like is generally preferred.

Gases suitable for use as chlorinating gases are subject to considerable variation. Chlorine, phosgene, carbon tetrachloride and mixtures thereof generally can be utilized in the practice of the present invention. It should be noted, however, that the particular chlorination gas utilized depends to some extent upon the particular metal chloride desired and reaction parameters such as temperature, particle size, etc. A preferred embodiment of the present invention, however, involves the use of chlorine as the sole or principal chlorination gas.

Free oxygen-containing gases suitable for the purposes of the present invention are well known. Generally preferred, however, are oxygen and/or oxygen-enriched air since they are readily available.

A better understanding of the present invention can be had when reference is made to the following example. However, this example is illustrative in nature and in no way is to be construed as restricting the scope of the present invention.

EXAMPLE 1

To apparatus of the type illustrated in FIGURE 2, fabricated from stainless steel lined with a ceramic composition and comprising a one inch I.D. upper section, ½ inch I.D. throat a total length of six inches, a 1/16 inch wide annulus 23, and whose conical section has an angle of divergence of about 20°, there is introduced oxygen at a rate of 10 s.c.f.h. by means of tangential conduit 21 and annulus 23. Then about 25 grams of 100 mesh coke is charged into reaction zone 15 by means of entry port 13; the coke is immediately drawn into the pocket of spinning gas in zone 15. There is also introduced a mixture of carbon monoxide (5 s.c.f.h.) and additional oxygen (5 s.c.f.h.) by means of tangential conduit 21 and annulus 23 which mixture is ignited, thereafter burning, and causing the coke and oxygen to react thereby preheating reaction zone 15 to about 900° C. About 50 grams of titaniferous ore having an average particle size of about 200 microns and about 50 grams of 100 mesh coke are then introduced into reaction zone 15 by means of entry port 13 and are also drawn into the pocket of spinning gas in zone 15. The flow of oxygen is reduced to a rate of 5 s.c.f.h. and chlorine is introduced at a rate of 25 s.c.f.h. into reaction zone 15 by means of annulus 23 and tangential conduit 21. The titanium tetrachloride produced exits through conduit 19 and is collected downstream by conventional collection apparatus. After 1 hour the flow of gases is shut off and about 15 grams of residue remaining is released through outlet 17.

Obviously, the design and specifications of the apparatus of the present invention are subject to variation. For instance, more than one annulus can be utilized for entry of gas or gases into the reaction chamber provided said gases are introduced into the annuli tangentially thereby providing whirling or spinning turbulence within the reaction zone.

In addition, inert gases such as nitrogen and helium can be utilized in accordance with the present invention. Said gases can be conveyed through annuli separately or in combination with any of the other gases utilized in the process.

What is claimed is:

1. In a process for producing metal chlorides by reacting with a chlorinating gas a particulate metal or metal compound while suspended in a fluid bed, the improvement which comprises introducing the chlorinating gas laterally into the lower portion of the reaction zone containing the particulate metal or metal compound, which portion has an upwardly diverging, vertical, frustoconical shape, said chlorinating gas being introduced forcefully with a lateral spinning action and at a rate sufficient to fluidize said particulate metal or metal compound in the form of a single well defined, rapidly whirling, turbulent bed of particulate material maintained substantially above and out of interference with the flow of said chlorinating gas feed as it enters, thereby avoiding plugging and erosion by any of the reactants or reaction products.

2. The process of claim 1 wherein said chlorinating gas is chosen from the group consisting of chlorine, phosgene, carbon tetrachloride or mixtures thereof.

3. The process of claim 1 wherein said chlorinating gas is chlorine.

4. The process of claim 1 wherein a metal compound and a chlorinating gas are reacted and there is present in the reaction zone a reducing agent chosen from the group consisting of carbonaceous material, carbon monoxide or mixtures thereof.

5. The process of claim 4 wherein said carbonaceous material is coke.

6. A process for making metal chlorides comprising introducing a particulate metal or metal compound into an elongated vertical, laterally enclosed, hot reaction zone through an opening in the upper part thereof, flowing a chlorinating gas helically around the outside of said laterally enclosed reaction zone so as to cool the lateral walls thereof and introducing said chlorinating gas into the lower part of said reaction zone at a point where it has an upward diverging frustoconical shape with a forceful lateral spinning action and at a rate sufficient to fluidize said particulate metal or metal compound in the form of a single, well defined, rapidly whirling, turbulent bed.

References Cited

UNITED STATES PATENTS

| | | | |
|---|---|---|---|
| 2,856,264 | 10/1958 | Dunn | 23—1 |
| 3,093,450 | 6/1963 | Luerssen et al. | 23—1 |
| 3,101,249 | 8/1963 | Priscu | 23—87 |
| 3,148,027 | 9/1964 | Richmond | 23—202 |
| 3,149,911 | 9/1964 | Fornasieri et al. | 23—87 |
| 3,228,751 | 1/1966 | Irani | 23—87 |
| 3,305,300 | 2/1967 | McBrayer | 23—15 |
| 3,306,760 | 2/1967 | Zirngibl et al. | 106—288 |

EDWARD STERN, Primary Examiner

U.S. Cl. X.R.

23—205